United States Patent Office.

CHARLES BOIZE, OF NEW YORK, N. Y., ASSIGNOR TO HIMSELF AND PETER M. DEVOS.

*Letters Patent No. 72,158, dated December 17, 1867.*

IMPROVED MODE OF PRESERVING EGGS AND OTHER SUBSTANCES.

*The Schedule referred to in these Letters Patent and making part of the same.*

TO ALL WHOM IT MAY CONCERN:

Be it known that I, CHARLES BOIZE, of New York, in the county and State of New York, have invented a new and useful Improvement in the Mode of Preserving Eggs, Meats, &c.; and I do hereby declare the following is a full, clear, and exact description thereof, which will enable others skilled in the art to make and use my invention.

The present invention relates to a new mode of preserving eggs, meats, and other articles of food; and it consists in the use of argillite, or argillaceous schist or slate, finely powdered, as a medium or means of packing or surrounding the eggs, or other article or articles, whereby they are enabled to be preserved and maintained fresh, and suitable for being transported from place to place without becoming deteriorated or rendered useless, the slate employed being susceptible of use over and over again, and in not the least manner or degree becoming deteriorated.

Having thus described my invention, I claim as new, and desire to secure by Letters Patent—

The use of argillite, substantially as and for the purpose described.

CHARLES BOIZE.

Witnesses:
    WM. F. MCNAMARA,
    ALEX. F. ROBERTS.